(12) United States Patent
Saito

(10) Patent No.: US 10,371,353 B2
(45) Date of Patent: Aug. 6, 2019

(54) LIGHT-EMITTING DEVICE

(71) Applicant: Enplas Corporation, Saitama (JP)

(72) Inventor: Tomohiro Saito, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 15/285,595

(22) Filed: Oct. 5, 2016

(65) Prior Publication Data

US 2017/0102125 A1    Apr. 13, 2017

(30) Foreign Application Priority Data

Oct. 13, 2015 (JP) ................ 2015-202090

(51) Int. Cl.
| | |
|---|---|
| *F21V 5/04* | (2006.01) |
| *F21V 9/00* | (2018.01) |
| *F21V 7/00* | (2006.01) |
| *F21V 13/04* | (2006.01) |
| *G02B 3/00* | (2006.01) |
| *G03B 15/03* | (2006.01) |
| *F21Y 115/10* | (2016.01) |

(52) U.S. Cl.
CPC ............... *F21V 9/00* (2013.01); *F21V 7/00* (2013.01); *F21V 13/04* (2013.01); *G02B 3/00* (2013.01); *G03B 15/03* (2013.01); *F21V 5/045* (2013.01); *F21Y 2115/10* (2016.08)

(58) Field of Classification Search
CPC . F21V 5/045; F21V 9/00; F21V 9/002; F21V 9/005; F21V 9/045
USPC .................................................. 362/249.02
See application file for complete search history.

(56) References Cited

U.S. PATENT DOCUMENTS

| | | | | |
|---|---|---|---|---|
| 2012/0300466 A1* | 11/2012 | Asai | ............... | G02B 19/0009 362/297 |
| 2014/0239336 A1* | 8/2014 | Streppel | .............. | F21V 5/045 257/98 |
| 2014/0355273 A1* | 12/2014 | Saito | .................... | F21V 5/04 362/309 |
| 2015/0062917 A1* | 3/2015 | Yin | ..................... | F21V 13/04 362/309 |

(Continued)

FOREIGN PATENT DOCUMENTS

| | | |
|---|---|---|
| JP | 2006-172772 A | 6/2006 |
| JP | 2011-192494 A | 9/2011 |

*Primary Examiner* — Jong-Suk James Lee
*Assistant Examiner* — Christopher E Dunay
(74) *Attorney, Agent, or Firm* — Brundidge & Stanger, P.C.

(57) ABSTRACT

A light-emitting device includes: a light emitting element; and a light flux controlling member configured to allow incidence of light from the light emitting element and emit light incident on the light flux controlling member. The light flux controlling member includes an incidence region and an emission region. The incidence region includes a fresnel lens part having a plurality of projected lines formed to surround a central axis of the light flux controlling member. The projected line includes an incidence surface configured to allow incidence of the light from the light emitting element, and a reflecting surface paired with the incidence surface and configured to reflect the light incident on the incidence surface toward the emission region. An angle between the incidence surface and a line parallel to the central axis is greater than an angle between the reflecting surface and a line parallel to the central axis.

4 Claims, 9 Drawing Sheets

(56) References Cited

U.S. PATENT DOCUMENTS

| | | | |
|---|---|---|---|
| 2015/0085513 A1* | 3/2015 | Spinger | F21S 48/2243 |
| | | | 362/522 |
| 2015/0247621 A1* | 9/2015 | Nakamura | F21V 5/045 |
| | | | 362/309 |
| 2016/0138777 A1* | 5/2016 | Shen | F21K 9/233 |
| | | | 362/308 |
| 2016/0363747 A1* | 12/2016 | Krijn | G02B 19/0066 |

* cited by examiner

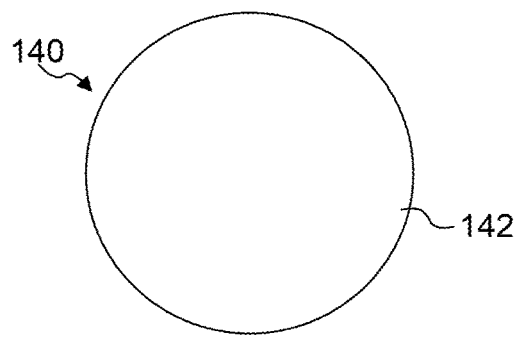
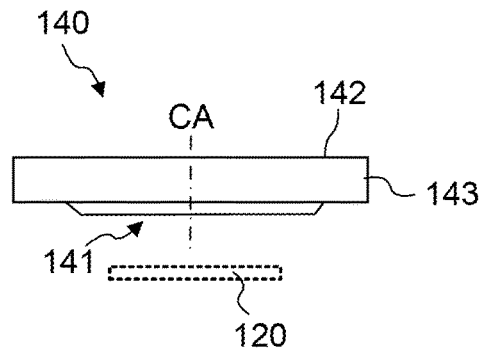
FIG. 3A    FIG. 3B
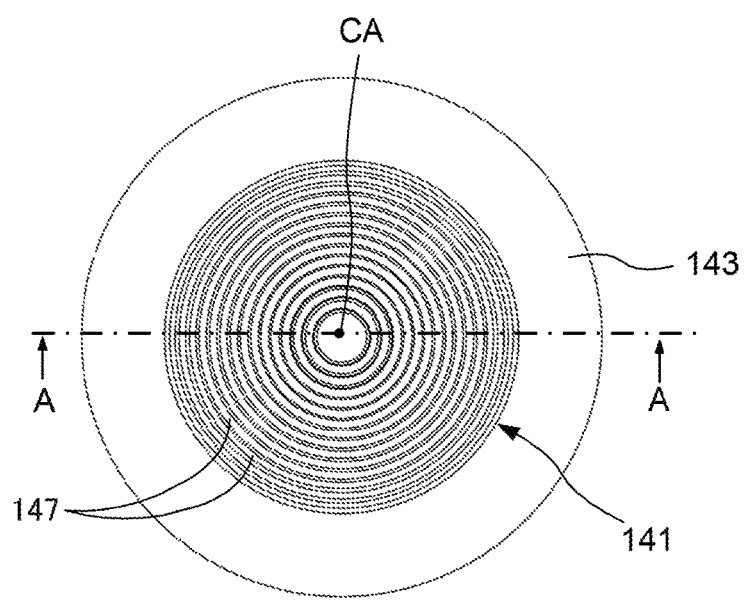
FIG. 3C

145A

145B

145C

LIGHT-EMITTING DEVICE

CROSS REFERENCE TO RELATED APPLICATIONS

This application is entitled to and claims the benefit of Japanese Patent Application No. 2015-202090, filed on Oct. 13, 2015, the disclosure of which including the specification, drawings and abstract is incorporated herein by reference in its entirety.

TECHNICAL FIELD

The present invention relates to a light-emitting device including a light flux controlling member that controls the distribution of light emitted from a light emitting element.

BACKGROUND ART

In recent years, for the purpose of energy saving and downsizing, light-emitting devices (light-emitting diode (hereinafter referred to as "LED") flashes) using a LED as the light source have been increasingly used as a light-emitting device for an image pickup camera. A well-known example of such light emitting devices is a light emitting device using a combination of an LED and a light flux controlling member (see, for example, PTL 1).

FIG. 1A is a sectional view of the light emitting device disclosed in PTL 1. As illustrated in FIG. 1A, light emitting device 10 disclosed in PTL 1 includes substrate 20, light source substrate 21, light source 30 including a light emitting element and a phosphor, and light flux controlling member 40. Light flux controlling member 40 is disposed on substrate 20 in such a manner as to face the light emitting surface of light source 30.

FIG. 1B is a sectional view of light flux controlling member 40. As illustrated in FIG. 1B, refractive fresnel lens part 41 and reflective fresnel lens part 42 are formed on one side of light flux controlling member 40. Each of Refractive fresnel lens part 41 and reflective fresnel lens part 42 has a plurality of concentrically formed annular protrusions. Refractive fresnel lens part 41 is formed at a position which faces light source 30. Reflective fresnel lens part 42 is formed around refractive fresnel lens part 41 in such a manner as to surround light source 30. In light flux controlling member 40, the surface on which refractive fresnel lens part 41 and reflective fresnel lens part 42 are formed functions as incidence region 43, and the surface on the side opposite to incidence region 43 functions as emission region 44.

In light-emitting device 10 illustrated in FIG. 1A, light emitted from light source 30 at a small angle to the optical axis is refracted in a predetermined direction by refractive fresnel lens part 41, and is emitted from emission region 44. On the other hand, light emitted from light source 30 at a large angle to the optical axis is incident on incidence surface 45 of reflective fresnel lens part 42, and emitted from emission region 44 after being reflected by reflecting surface 46 in a direction parallel to the optical axis of the light source. In this manner, light emitting device 10 disclosed in PTL 1 controls the distribution of the light emitted from light source 30 with use of light flux controlling member 40 including refractive fresnel lens part 41 and reflective fresnel lens part 42.

In addition, as a light flux controlling member including a reflective fresnel lens part, an inner lens of a light fixture for a vehicle and the like have been proposed (see, for example, PTL 2). In PTL 2, the use efficiency of light is improved by reflecting a part of the light incident on the reflective fresnel lens such that the light approaches the central axis side of the light flux controlling member.

CITATION LIST

Patent Literature

PTL 1
Japanese Patent Application Laid-Open No. 2011-192494
PTL 2
Japanese Patent Application Laid-Open No. 2006-172772

SUMMARY OF INVENTION

Technical Problem

For example, with the conventional light-emitting devices disclosed in PTL 1, the illuminance tends to be increased in a region around the optical axis of the light emitting element on the illumination surface orthogonal to the optical axis of the light emitting element, and consequently the illuminance of the illumination region has been difficult to be uniformized. Likewise, with the light-emitting device disclosed in PTL 2, the illuminance tends to be increased in a region around the optical axis of the light emitting element on the illumination surface orthogonal to the optical axis of the light emitting element, and the uniformization of the illuminance of the illumination region cannot be achieved.

An object of the present invention is to provide a light-emitting device which can uniformly and efficiently illuminate an illumination surface orthogonal to the optical axis of a light emitting element with the light emitted from the light emitting element.

Solution to Problem

To achieve the above-mentioned object, a light-emitting device of an embodiment of the present invention includes: a light emitting element; and a light flux controlling member disposed to cover the light emitting element such that a central axis of the light flux controlling member is parallel to an optical axis of the light emitting element, the light flux controlling member being configured to allow incidence of light emitted from the light emitting element and emit light incident on the light flux controlling member while controlling a light distribution of the light incident on the light flux controlling member. The light flux controlling member includes an incidence region and an emission region, the incidence region being disposed on the light emitting element side and configured to allow incidence of the light emitted from the light emitting element, the emission region being disposed on a side opposite to the incidence region of the light flux controlling member and configured to emit light incident on the incidence region. The incidence region includes a fresnel lens part having a plurality of projected lines which are similar to each other in plan view and are formed to surround the central axis, and at least a part of the fresnel lens part faces at least a part of a light emitting surface of the light emitting element. The projected line includes an incidence surface configured to allow incidence of a part of the light emitted from the light emitting element, and a reflecting surface paired with the incidence surface and configured to reflect the light incident on the incidence surface toward the emission region, and an angle between the incidence surface and a line parallel to the central axis is greater than an angle between the reflecting surface and a line parallel to the central axis.

Advantageous Effects of Invention

The light-emitting device of an embodiment of the present invention can uniformly illuminate the entirety of an illumination region with light emitted from a light emitting element.

BRIEF DESCRIPTION OF DRAWINGS

FIGS. 3A to 3C illustrate a configuration of the light flux controlling member according to the embodiment;

DESCRIPTION OF EMBODIMENTS

An embodiment of the present invention is described below in detail with reference to the accompanying drawings.

(Configurations of Light Flux Controlling Member and Light-Emitting Device)

Figure 1A:
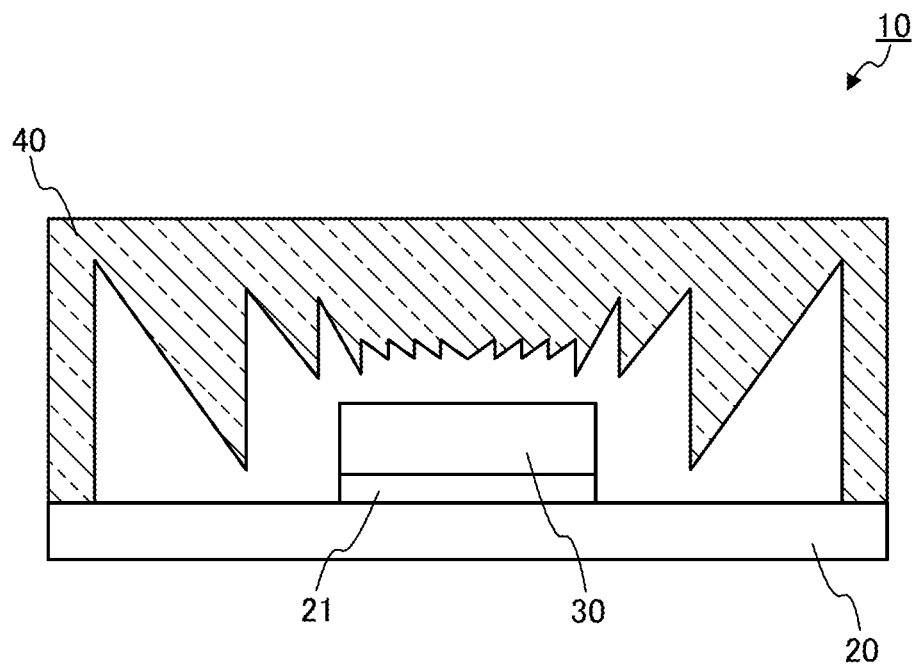
FIGS. 1A and 1B illustrate a configuration of a light-emitting device disclosed in PTL 1.
Figure 1B:
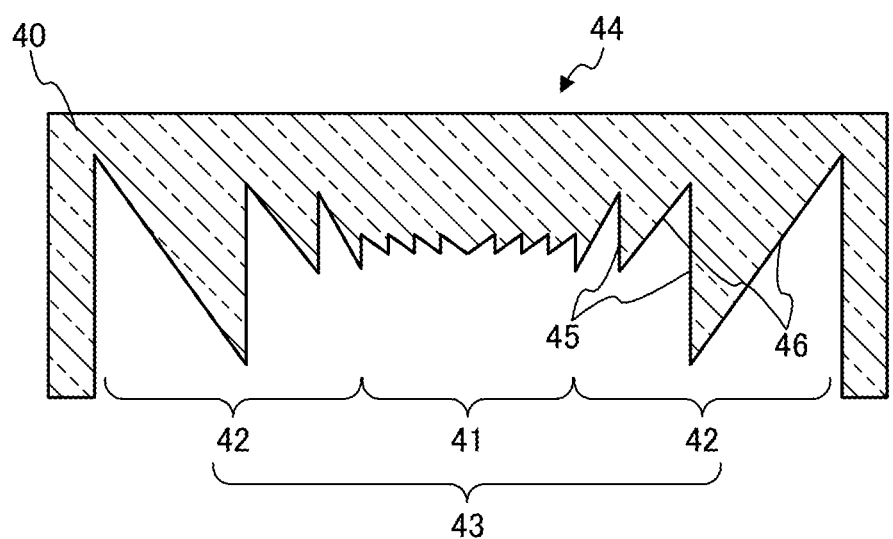
Figure 2:
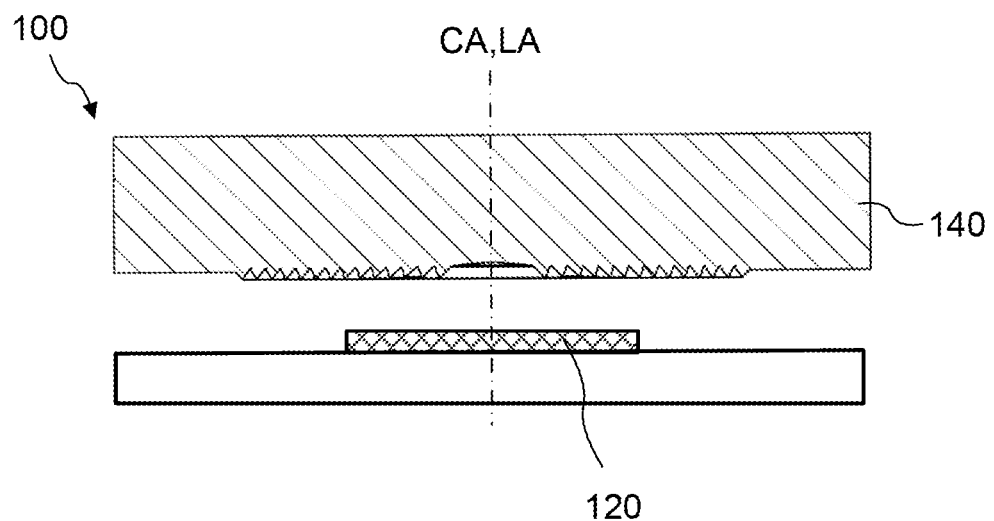
FIG. 2 is a sectional view of a light-emitting device according to an embodiment.

FIG. 2 is a sectional view of light-emitting device 100 according to an embodiment of the present invention. As illustrated in FIG. 2, light-emitting device 100 includes light emitting element 120 and light flux controlling member 140. The type of light emitting element 120 is not limited as long as light emitting element 120 is a device having a light emitting surface as such as a light-emitting diode (LED), for example. On the other hand, light flux controlling member 140 is a member for controlling the distribution of light emitted from light emitting element 120, and is disposed such that its central axis CA is parallel to optical axis LA of light emitting element 120, and that light flux controlling member 140 covers light emitting element 120. While light emitting element 120 and light flux controlling member 140 are disposed such that optical axis LA of light emitting element 120 coincides with central axis CA of light flux controlling member 140 in the present embodiment, optical axis LA of light emitting element 120 and central axis CA of light flux controlling member 140 may not coincide with each other as long as optical axis LA of light emitting element 120 and central axis CA of optical axis control member 140 are parallel to each other.

Light flux controlling member 140 can be formed by injection molding. The material of light flux controlling member 140 is not specifically limited as long as the light having desired wavelengths can pass through light flux controlling member 140. Examples of the material of light flux controlling member 140 include: light transmissive resins such as polymethylmethacrylate (PMMA), polycarbonate (PC), and epoxy resin (EP); or light transmissive glass.

Figure 4A:
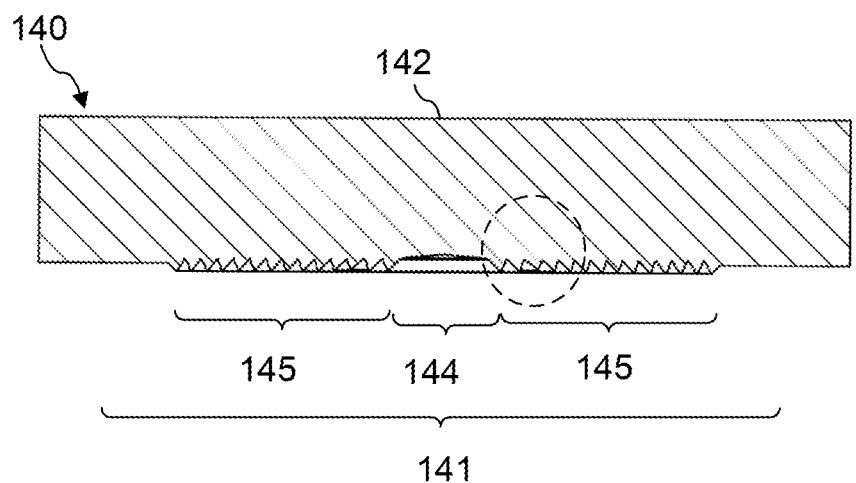
FIGS. 4A and 4B are sectional views of the light flux controlling member according to the embodiment.
Figure 4B:
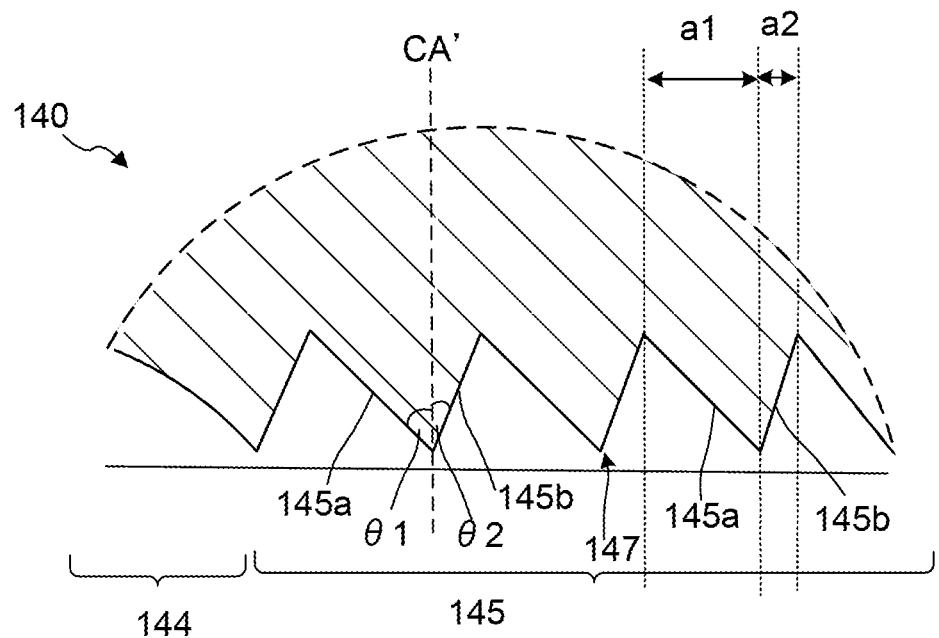

FIG. 3A to FIG. 4B illustrate a configuration of light flux controlling member 140 of light-emitting device 100 according to the embodiment of the present invention. FIG. 3A is a plan view of light flux controlling member 140, FIG. 3B is a side view of light flux controlling member 140, and FIG. 3C is a bottom view of light flux controlling member 140. FIG. 4A is a sectional view taken along line A-A of FIG. 3C, and FIG. 4B is an enlarged view of the portion indicated by the broken line in FIG. 4A.

As illustrated in FIG. 3A to FIG. 4B, light flux controlling member 140 includes incidence region 141 and emission region 142. Incidence region 141 is disposed on light emitting element 120 side, and the light emitted from light emitting element 120 is incident on incidence region 141. Emission region 142 is disposed on the side opposite to incidence region 141 of light flux controlling member 140, and the light incident on incidence region 141 is emitted from emission region 142. Light flux controlling member 140 may be provided with flange 143 at a position around incidence region 141 and emission region 142. The shape of flange 143 is not limited (see, for example, FIG. 5B).

Incidence region 141 of the present embodiment includes refraction part 144 located at a center portion of incidence region 141, and fresnel lens part 145 formed to surround central axis CA and refraction part 144. In the present embodiment, light flux controlling member 140 is disposed such that refraction part 144 and a part of fresnel lens part 145 face the light emitting surface of light emitting element 120. It is to be noted that light flux controlling member 140 may be disposed such that the entire surface of incidence region 141 (refraction part 144 and the entirety of fresnel lens part 145) face the light emitting surface of light emitting element 120.

In the present embodiment, refraction part 144 is formed at a position where refraction part 144 intersects with central axis CA of light flux controlling member 140 (optical axis LA of light emitting element 120). Refraction part 144 allows a part of light emitted from light emitting element 120 (light emitted at a small angle to optical axis LA) to enter light flux controlling member 140, and refracts the light toward emission region 142. The shape of refraction part 144 is not limited as long as the above-mentioned function can be obtained. While refraction part 144 is formed to have a hemispherical recess in the present embodiment, refraction part 144 may be formed to have a recess of a columnar shape, a rectangular prism shape, a truncated cone shape, or a truncated pyramid shape, for example. In addition, refraction part 144 may be formed to protrude to light emitting element 120 side. In addition, refraction part 144 may be a refractive fresnel lens part.

On the other hand, fresnel lens part 145 allows a part of light (light emitted at a slightly large angle to optical axis LA) emitted from the emission center (the intersection of the surface of light emitting element 120 and optical axis LA) of light emitting element 120 to enter light flux controlling member 140, and reflects a part of the incident light to emission region 142 side such that the part of the incident light approaches optical axis LA side. In addition, fresnel lens part 145 of the present embodiment reflects the part of the light incident on light flux controlling member 140 to emission region 142 side such that the part of the light reaches the illumination region on the opposite side with respect to optical axis LA (see FIG. 6B). Meanwhile, fresnel lens part 145 allows a part of light emitted from an outer peripheral portion of the light emitting surface of light emitting element 120 (light emitted in a direction substantially parallel to optical axis LA) to enter light flux controlling member 140, and refracts a part of the incident light to emit the part of the incident light from emission region 142 such that the part of the incident light travels away from optical axis LA (see FIG. 8).

That is, in light-emitting device 100 of the present embodiment, the light emitted from light emitting element 120 is reflected or refracted with fresnel lens part 145 in various directions. With this configuration, a situation where the brightness is increased only at a center portion of the illumination region can be prevented, and the illumination region can be uniformly illuminated with light. In addition, as described later, the illumination region can be uniformly illuminated with light also by reflecting a part of the light emitted from the light emission center of light emitting element 120 toward the illumination region on the opposite side with respect to optical axis LA with fresnel lens part 145.

Here, as illustrated in the bottom view of FIG. 3C, fresnel lens part 145 includes a plurality of projected lines 147 similar to one another in plan view. While projected lines 147 have a shape of a plurality of concentrically formed circles in plan view in the present embodiment, the shape of projected lines 147 is not limited to this, and projected lines 147 may have a polygonal shape for example. In addition, the distance between projected lines 147 adjacent to each other in plan view may be constant or not constant.

Here, as illustrated in the sectional view of FIG. 4B, each of projected lines 147 includes incidence surface 145a which allows a part of light emitted from the light emission center (light emitted at a slightly large angle to optical axis LA) to enter light flux controlling member 140, and reflecting surface 145b which reflects the light incident on incidence surface 145a toward emission region 142. It is to be noted that the light incident on incidence surface 145a is refracted.

In projected line 147 of the present embodiment, incidence surface 145a is located on central axis CA (optical axis LA) side of the light flux controlling member, and reflecting surface 145b is located on the outer periphery side of light flux controlling member 140. Incidence surface 145a and reflecting surface 145b adjacent to each other may be continuous or discontinuous. In the former case, a ridgeline is formed between incidence surface 145a and reflecting surface 145b. In the latter case, another surface is formed between incidence surface 145a and reflecting surface 145b. In the case where another surface is provided between incidence surface 145a and reflecting surface 145b, the acute-angled portion (ridgeline portion) can be eliminated, and the manufacturability of the light flux controlling member can be increased.

In the cross-section including central axis CA, the shape of incidence surface 145a of projected line 147 may be a straight line or a curved line. Likewise, in the cross-section including central axis CA, the shape of reflecting surface 145b of projected line 147 may be a straight line or a curved line. It should be noted that, in the cross-section including central axis CA, angle θ1 between incidence surface 145a and line CA' which is parallel to central axis CA, and angle θ2 between reflecting surface 145b and line CA' which is parallel to central axis CA satisfy a relationship of θ1>θ2, that is, θ1 is greater than θ2, as illustrated in FIG. 4B. With θ1 set to an angle greater than θ2, the light from the light emission center of light emitting element 120 which is incident on incidence surface 145a can be reflected toward the illumination region on the opposite side with respect to the light optical axis LA of light emitting element 120. It is to be noted that in the case where incidence surface 145a is a curved line in the cross-section including central axis CA, the "angle of incidence surface 145a" is the angle of the tangent to incidence surface 145a at the incident point of light. On the other hand, the "angle of reflecting surface 145b" is the angle of the tangent to reflecting surface 145b at the reflection point of light.

Preferably, in plan view of light flux controlling member 140, each projected line 147 is formed such that width a1 of incidence surface 145a is greater than width a2 of reflecting surface 145b (a1>a2). With width a1 and width a2 satisfying such a relationship, the light emitted from the light emission center of light emitting element 120 can be reflected toward the optical axis (central axis CA of light flux controlling member) side of light emitting element 120.

It is to be noted that, in the cross-section including central axis CA, the cross-sectional shapes of projected lines 147 may be identical to each other or similar to each other, or, different from each other. For example, projected lines 147 may have heights different from each other. In addition, another surface may be formed between incidence surface 145a and reflecting surface 145b of projected lines 147 adjacent to each other.

In addition, the shape of emission region 142 of light flux controlling member 140 is not limited. While emission region 142 has a planar shape in the present embodiment, emission region 142 may have a curved surface shape.

Figure 5A:
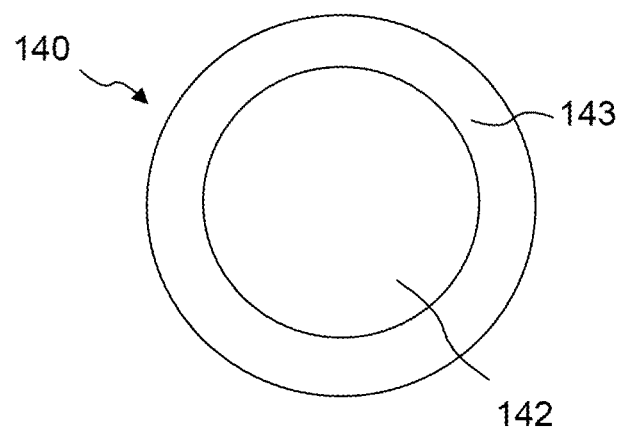
FIGS. 5A to 5C illustrate a configuration of the light flux controlling member according to the embodiment.
Figure 5B:
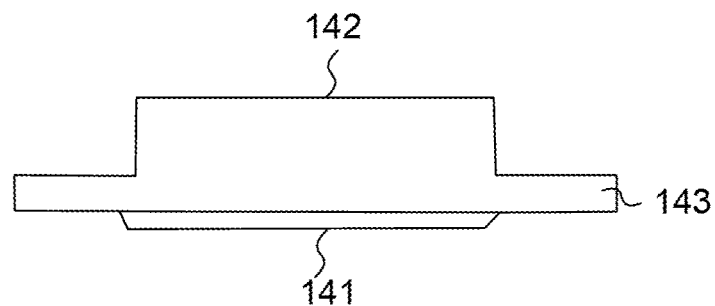
Figure 5C:
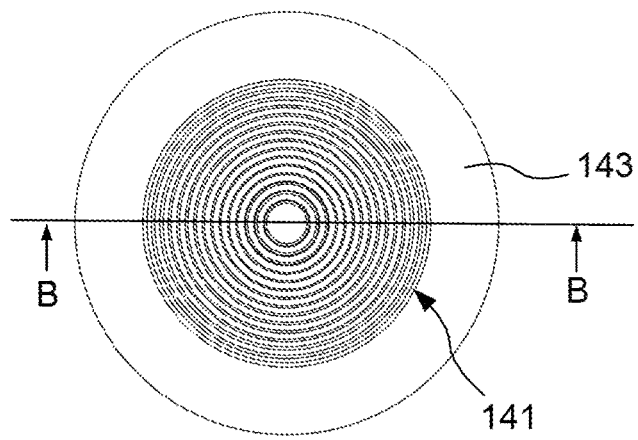

In addition, the shape of light flux controlling member 140 is not limited. While light flux controlling member 140 having a substantially columnar shape as illustrated in FIG. 3A to FIG. 4B has been described as an example, light flux controlling member 140 may have flange 143 having a small thickness as illustrated in FIGS. 5A to 5C. FIG. 5A is a plan view of light flux controlling member 140, FIG. 5B is a side view of light flux controlling member 140, and FIG. 5C is a bottom view of light flux controlling member 140.

(Simulations of Light Path and Illuminance)

Figure 6A:
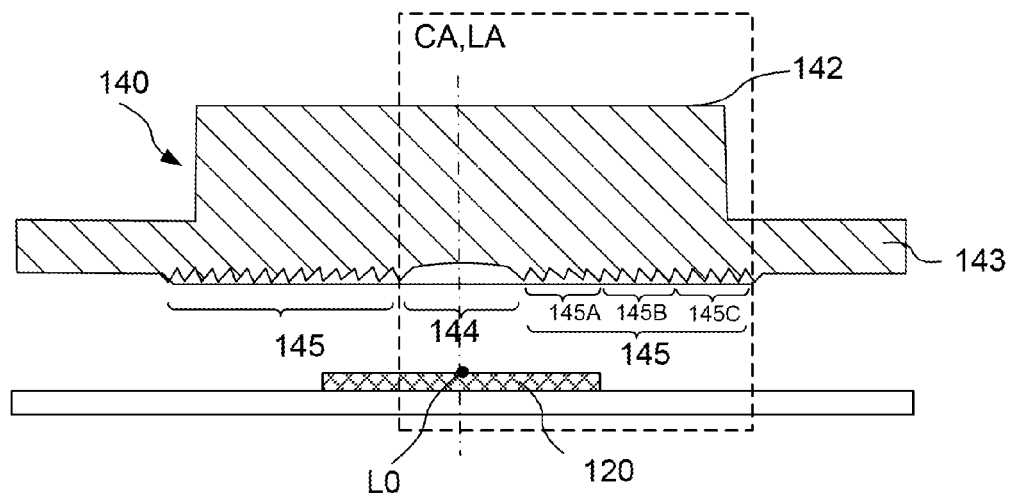
FIG. 6A is a sectional view of the light-emitting device according to the embodiment.

FIG. 6A to FIG. 8 are sectional views and light path views of light-emitting device 100 including light flux controlling member 140 illustrated in FIGS. 5A to 5C. FIG. 6A is a sectional view of light-emitting device 100 including light flux controlling member 140 illustrated in FIGS. 5A to 5C in a cross-section including optical axis LA of light emitting element 120 (a sectional view taken along line B-B of FIG. 5C of light flux controlling member 140). FIG. 6B illustrates light paths of light emitted from light emission center L0 of light emitting element 120 in the region surrounded by the broken line in FIG. 6A.

Figure 7A:
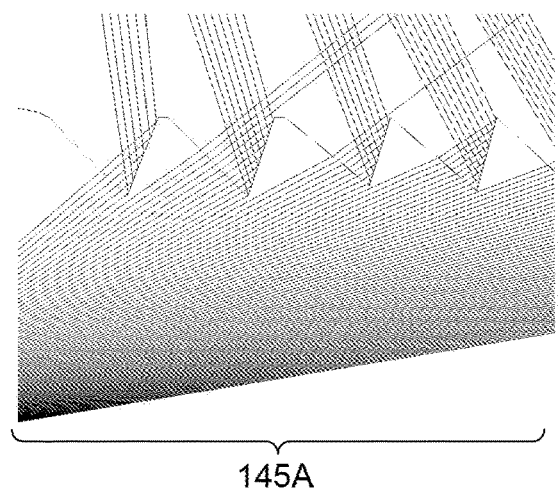
FIGS. 7A to 7C illustrate light paths of the light-emitting device according to the embodiment.
Figure 7B:
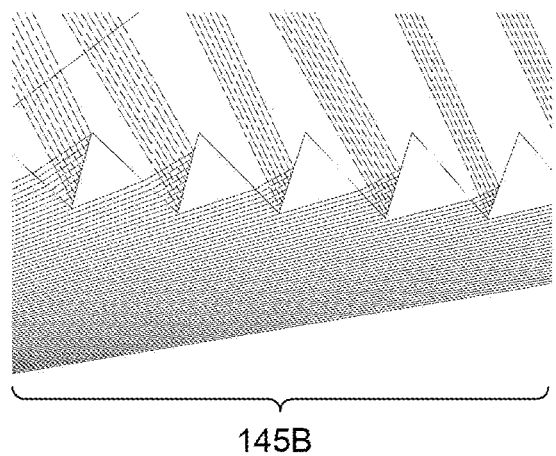
Figure 7C:
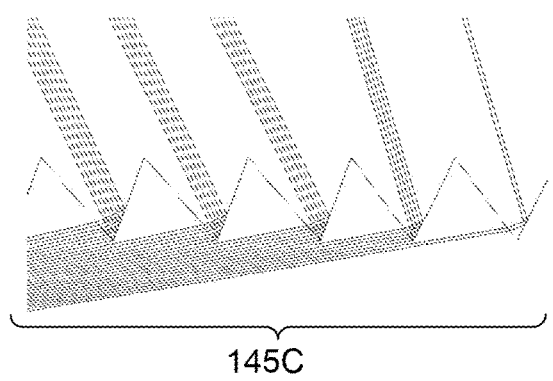
Figure 8:
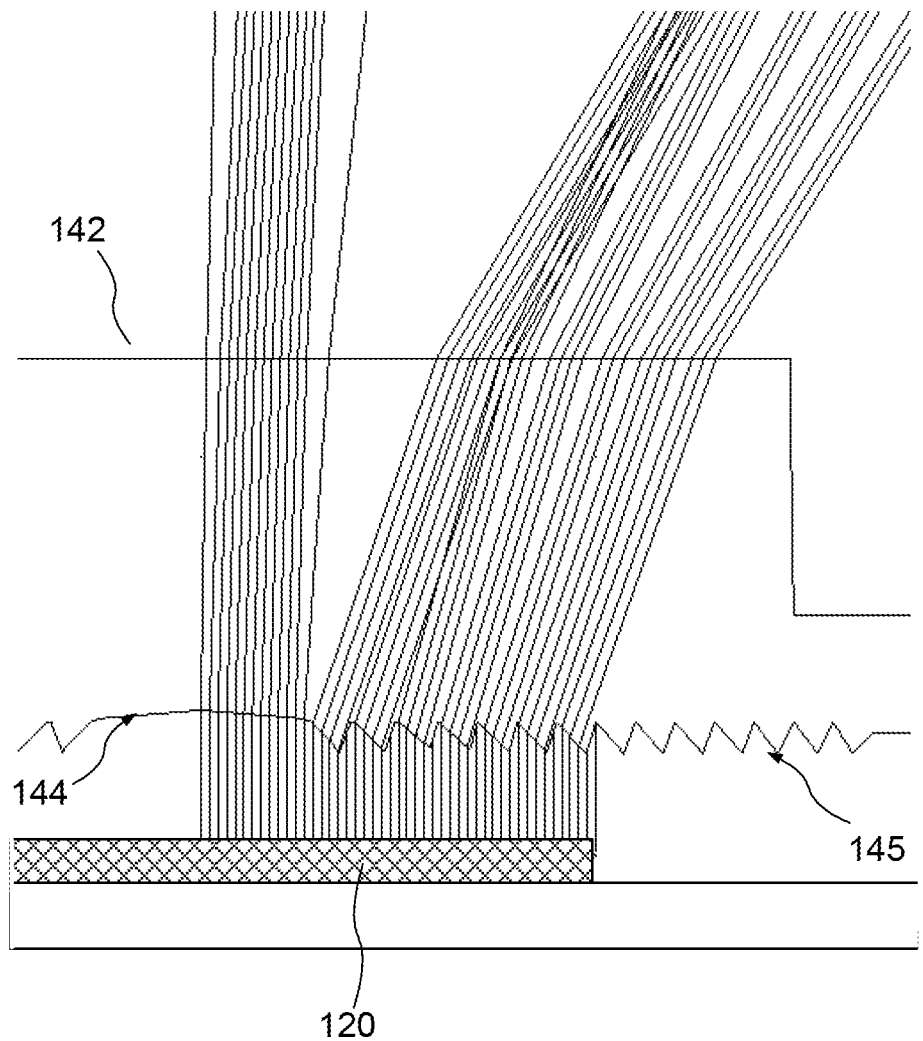
FIG. 8 illustrates light paths of the light-emitting device according to the embodiment.

FIGS. 7A to 7C illustrate light paths of light from light emission center L0 side of light emitting element 120 which is incident on three regions which are obtained by dividing fresnel lens part 145 into three regions in a cross-section including optical axis LA of light emitting element 120. FIG. 7A illustrates light paths of light which is incident on fresnel lens part 145 from light emission center L0 side of light emitting element 120 in a region at a center of fresnel lens part 145 in the radial direction (the region denoted with 145A in FIG. 6A). FIG. 7B illustrates light paths of light incident on fresnel lens part 145 from the light emission center L0 side of light emitting element 120 in a region at a center of fresnel lens part 145 in the radial direction (the region denoted with 145B in FIG. 6A). FIG. 7C illustrates light paths of light incident on fresnel lens part 145 from the light emission center L0 side of light emitting element 120 in a region at an outer periphery side of fresnel lens part 145 in the radial direction (the region denoted with 145C in FIG. 6A). FIG. 8 illustrates light paths of light which travels in a direction parallel to optical axis LA from light emitting element 120.

In the following description, the angle to optical axis LA of the light from emission region 142 which travels away from optical axis LA as it travels away from emission region 142 is "positive," and the angle to optical axis LA of the light from emission region 142 which approaches optical axis LA as it travels away from emission region 142 is "negative." It is to be noted that the light travelling in the "negative" direction may intersect with optical axis LA. In this case, the light after intersection with the optical axis travels away from optical axis LA as it travels away from emission region 142.

Figure 6B:
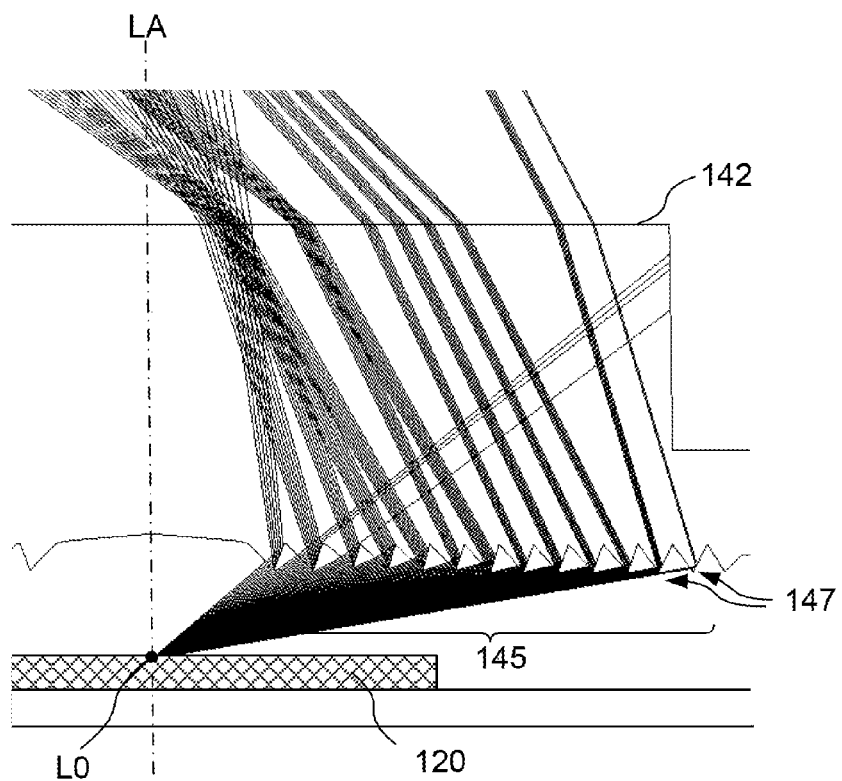
FIG. 6B illustrates light paths of the light-emitting device according to the embodiment.

In light-emitting device 100 of the present embodiment, the light emitted from light emission center L0 of light emitting element 120 is incident on the incidence surface of projected line 147 of fresnel lens part 145 in incidence region 141 of light flux controlling member 140 as illustrated in FIG. 6B. The light incident on projected line 147 is refracted, and reflected by the reflecting surface of projected line 147, and, emitted from emission region 142. At this time, the angle to optical axis LA of the emission light emitted from emission region 142 is "negative." In addition, a part of the light emitted from emission region 142 intersects with optical axis LA, and travels toward the illumination region on the opposite side with respect to optical axis LA.

Typically, in the case of a common reflection type fresnel lens, when light from a light emitting element is emitted toward the targeted illumination region through a reflective fresnel lens, the angle to optical axis LA (the emission angle, which is equal to an angle to the central axis of the light flux controlling member) of the emission light emitted from emission region 142 is set to an angle in a range of 0° (parallel to optical axis LA) to the "positive." With this method, however, the emission light emitted from emission region 142 has a high luminous intensity in the optical axis LA direction even when the angles of the incidence surface and the reflecting surface of projected line 147 are adjusted, and therefore uniformization of the illuminance of the illumination region is difficult to achieve. In contrast, in the present embodiment, the angles of the incidence surface and the reflecting surface of projected line 147 are controlled such that the angle to optical axis LA of the emission light emitted from emission region 142 is "negative," and thus the luminous intensity of the emission light emitted from emission region 142 in the optical axis LA direction can be reduced. That is, the brightness of the region around optical axis LA in the illumination region can be suppressed, and in turn, the uniformity of the illuminance distribution of the illumination region can be improved.

It is to be noted that, in the present embodiment, the angle to optical axis LA of the light which is incident on fresnel lens part 145 from the light emission center of light emitting element 120 and is reflected by the reflecting surface of projected line 147 to be emitted from emission region 142 is "negative" in all regions in fresnel lens part 145 as illustrated in FIGS. 7A to 7C. It should be noted that projected line 147 of fresnel lens part 145 may also be designed such that the angle to optical axis LA of the emission light is "positive" in a region in fresnel lens part 145.

Here, as illustrated in FIG. 8, the light which is incident on refraction part 144 from light emitting element 120 in a direction substantially parallel to optical axis LA is emitted from emission region 142 in a direction substantially parallel to optical axis LA, or a direction whose angle to optical axis LA is "positive." On the other hand, the light which is incident on fresnel lens part 145 from light emitting element 120 in a direction substantially parallel to optical axis LA is emitted from light emission region 142 in a direction whose angle to optical axis LA is "positive." That is, fresnel lens part 145 functions as a concave lens for the incident light in a direction substantially parallel to optical axis LA, and refracts the light to the outer periphery side of the illumination region. With this configuration, the illuminance of light emitting element 120 in a region around optical axis LA in the illumination region is not excessively increased, and the illuminance in the illumination region can be uniformized. It is to be noted that, in the present embodiment, the light which is incident on fresnel lens part 145 from light emitting element 120 in a direction substantially parallel to optical axis LA is incident on fresnel lens part 145 also from the reflecting surface of the projected line as well as from the incidence surface of the projected line.

Figure 9A:
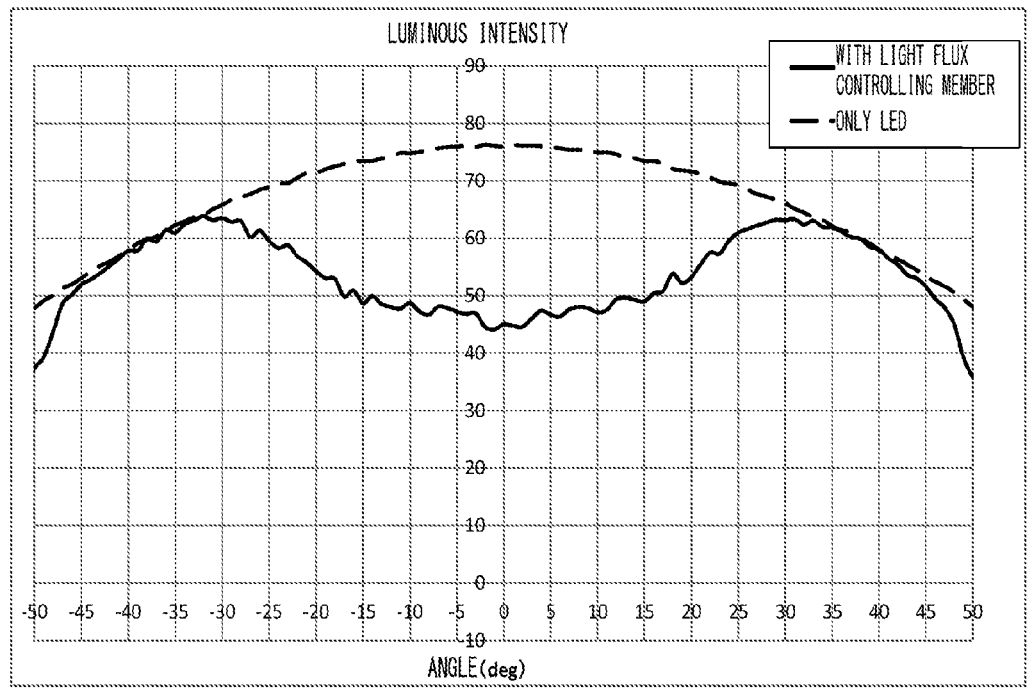
FIG. 9A shows a result of a simulation of the luminous intensity distribution in the light-emitting device according to the embodiment.
Figure 9B:
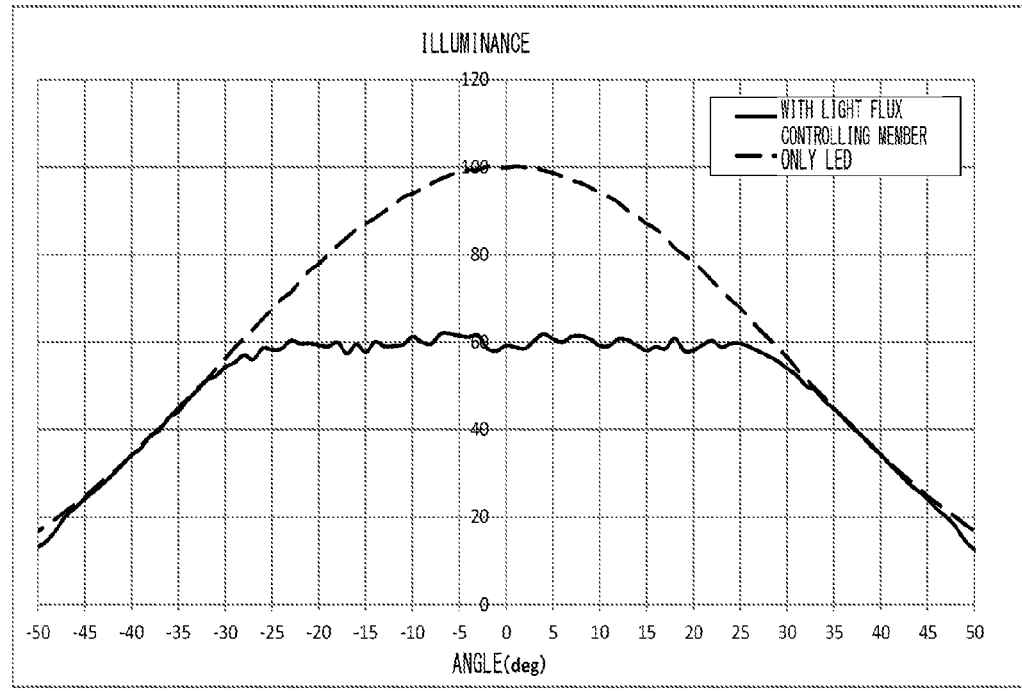
FIG. 9B shows a result of a simulation of the illuminance distribution using the light-emitting device according to the embodiment.

Here, FIG. 9A is a graph showing a result of a simulation of the luminous intensity distribution of light-emitting device 100. In FIG. 9A, the angle of the light emitted from light-emitting device 100 in a direction of optical axis LA of light emitting element 120 is set to 0°, and the luminous intensity of the light emitted in the range of ±50° with respect to optical axis LA is plotted. The above-mentioned range covers the range corresponding to the emission angles of ±40°, which is the targeted range for improvement in uniformity in light-emitting device 100 according to the present embodiment. On the other hand, FIG. 9B is a graph showing a result of a simulation of the illuminance distribution of the illumination region of light-emitting device 100. To be more specific, FIG. 9B is a graph showing a relative illuminance on an illumination surface (plane) which is located at a position 1 m remote from the light emitting surface of light emitting element 120 of light-emitting device 100 and is orthogonal to optical axis LA. In FIG. 9B, the angle of the light emitted from light-emitting device 100 in a direction of optical axis LA of light emitting element 120 is set to 0°. In FIG. 9B, the illuminance of the point where the light emitted in the above-mentioned direction reaches is plotted as 100%, and the relative illuminance of the points where the light emitted in the range of ±50° with respect to optical axis LA reach are plotted.

As indicated with the broken line in FIG. 9A, in the case where the light emitted from light emitting element 120 which has not passed through the light flux controlling member is emitted from light-emitting device 100, the luminous intensity increases as the distance to the optical axis decreases. In addition, the illuminance of the illumination region illuminated with light from such a device increases as the distance to the optical axis) (0°) decreases as indicated with the broken line in FIG. 9B.

Generally, the following problems arise in the case where light-emitting device 100 and the illumination surface are opposed to each other. Specifically, regarding the light emitted from light-emitting device 100, in the case of the light whose angle to optical axis LA is small, the distance between the point where the light reaches the illumination surface and the light-emitting device is small, and the incident angle to the illumination surface is small, and consequently, the illuminance on the illumination surface tends to be high. Meanwhile, in the case of the light whose angle to optical axis LA is large, the distance between the point where the light reaches the illumination surface and the light-emitting device is large, and the incident angle to the illumination surface is large, and consequently, the illuminance on the illumination surface tends to be low.

In view of this, in the present embodiment, the luminous intensity is controlled such that the luminous intensity in a region around optical axis LA (0°) of light-emitting device 100 is reduced, and the luminous intensity is increased as the emission angle to optical axis LA increases for the purpose of improving the uniformity of the illumination region. As a result, as indicated with the solid line in FIG. 9B, the illuminance of the illumination region where the emission light of the range of −30° to 30° reaches can be substantially uniformized. Further, in light-emitting device 100 of the present embodiment, the illuminance of the illumination region where the emission light of the range of ±40° reaches can be set to 50% or greater of the illuminance of the portion where the light emitted in the direction of optical axis (0°) reaches. That is, uniform and sufficient illuminance can be obtained in the range of ±40°.

EFFECT

As described above, in the light-emitting device according to the present embodiment, the fresnel lens part of the light flux controlling member controls a part of light emitted from the light emission center of the light emitting element such that the light reaches the illumination region on the opposite side with respect to the optical axis. Further, the fresnel lens part controls the light emitted from the light emitting element in a direction parallel to the optical axis such that the light is emitted to the outer periphery side of the illumination region. Thus, the light-emitting device can uniformly illuminate the illumination region.

INDUSTRIAL APPLICABILITY

The light-emitting device according to the embodiment of the present invention can uniformly illuminate the illumination region. Accordingly, the light-emitting device according to the embodiment of the present invention is useful for a flash of a camera, for example.

REFERENCE SIGNS LIST

10, 100 Light-emitting device
20, 340 Substrate
21 Light source substrate
30 Light source
40, 140 Light flux controlling member
41 Refractive fresnel lens part
42 Reflective fresnel lens part
43, 141 Incidence region
44, 142 Emission region
45, 145a Incidence surface
46, 145b Reflecting surface
120 Light Emitting element
143 Flange
144 Refraction part
145 Fresnel lens part
147 Projected line
CA Central axis
LA Optical axis
L0 Light emission center

The invention claimed is:

1. A light-emitting device comprising:
a light emitting element; and
a light flux controlling member disposed to cover the light emitting element such that a central axis of the light flux controlling member is parallel to an optical axis of the light emitting element, the light flux controlling member being configured to allow incidence of light emitted from the light emitting element and emit light incident on the light flux controlling member while controlling a light distribution of the light incident on the light flux controlling member, wherein:
the light flux controlling member includes an incidence region and an emission region, the incidence region being disposed on the light emitting element side and configured to allow the incidence of the light emitted from the light emitting element, the emission region being disposed on a side opposite to the incidence region of the light flux controlling member and configured to emit the light incident on the incidence region,
the incidence region includes a fresnel lens part having a plurality of projected lines which are similar to each other in plan view and are formed to surround the central axis,
at least a part of the fresnel lens part faces at least a part of a light emitting surface of the light emitting element,
a projected line of the plurality of projected lines includes an incidence surface configured to allow incidence of a part of the light emitted from the light emitting element, and a reflecting surface paired with the incidence surface and configured to reflect the light incident on the incidence surface towards the emission region,
the incidence surface of the projected line directs, mainly toward the reflecting surface, light that is incident on the incidence surface of the projected line after being emitted from a light emission center of the light emitting element,
the reflecting surface of the projected line reflects, toward the emission region side, at least the light that is incident on the incidence surface after being emitted from the light emission center of the light emitting element such that the light approaches the optical axis of the light emitting element,
the reflecting surface of the projected line allows incidence of light emitted from the light emitting element in a direction parallel to the optical axis, and
an angle between the incidence surface of the projected line and a line parallel to the central axis is greater than an angle between the reflecting surface of the projected line and a line parallel to the central axis.

2. The light-emitting device according to claim 1, wherein the fresnel lens part includes a plurality of annular projected lines concentrically formed around the central axis of the light flux controlling member.

3. The light-emitting device according to claim 1, wherein the incidence region further includes a refraction part disposed to intersect with the optical axis of the light emitting element and configured to allow incidence of a part of the light emitted from the light emitting element.

4. The light-emitting device according to claim 2, wherein the incidence region further includes a refraction part disposed to intersect with the optical axis of the light emitting element and configured to allow incidence of a part of the light emitted from the light emitting element.

* * * * *